(12) United States Patent
Okumura

(10) Patent No.: US 8,573,679 B2
(45) Date of Patent: Nov. 5, 2013

(54) SLIDE DOOR CONSTANT FEEDING SYSTEM

(75) Inventor: Masahiro Okumura, Shiga (JP)

(73) Assignees: Furukawa Electric Co., Ltd., Tokyo (JP); Furukawa Automotive Systems Inc., Inukami-gun (JP)

( * ) Notice: Subject to any disclaimer, the term of this patent is extended or adjusted under 35 U.S.C. 154(b) by 0 days.

(21) Appl. No.: 13/320,820

(22) PCT Filed: Mar. 9, 2011

(86) PCT No.: PCT/JP2011/055517
§ 371 (c)(1),
(2), (4) Date: Nov. 16, 2011

(87) PCT Pub. No.: WO2011/111745
PCT Pub. Date: Sep. 15, 2011

(65) Prior Publication Data
US 2012/0080215 A1    Apr. 5, 2012

(30) Foreign Application Priority Data

Mar. 11, 2010    (JP) .................................. 2010-054986

(51) Int. Cl.
*B60J 5/12*    (2006.01)

(52) U.S. Cl.
USPC ........................................................ 296/155

(58) Field of Classification Search
USPC ........................................................ 296/155
See application file for complete search history.

(56) References Cited

U.S. PATENT DOCUMENTS 8,070,212 B2 * 12/2011 Shima et al. ................... 296/155
8,196,351 B2 *  6/2012 Aoki et al. ...................... 49/360

FOREIGN PATENT DOCUMENTS

| JP | 2001-151042 | * | 6/2001 |
| JP | 2004 025999 | | 1/2004 |
| JP | 2007 253701 | | 10/2007 |
| JP | 2008 178208 | | 7/2008 |
| JP | 2010 023757 | | 2/2010 |

OTHER PUBLICATIONS

International Search Report Issued Apr. 12, 2011 in PCT/JP11/055517 Filed Mar. 9, 2011.
Office Action issued Nov. 15, 2012 in Japanese Patent Application No. 2010-054986 (with English-language translation).
Office Action issued Mar. 22, 2013 in Japanese Application No. 2010-054986 filed Mar. 11, 2010 (With English Translation).

* cited by examiner

*Primary Examiner* — Dennis Pedder
(74) *Attorney, Agent, or Firm* — Oblon, Spivak, McClelland, Maier & Neustadt, L.L.P.

(57) ABSTRACT

There is provided a slide door constant feeding system whose crossover portion of a wire harness does not interfere with a wall portion of a door trim in opening/closing a slide door and which excels in durability. The slide door constant feeding system comprises a door-side feeding fixture having a main part attached to a door trim, a leg member whose one end is attached to the main part and a door-side anchoring section attached to other end of the leg member and anchoring a door-side end of a crossover portion of a wire harness, a body-side feeding fixture attached to a car body and anchoring a body-side end of the crossover portion and the wire harness for feeding power from the car body-side to the door-side. The door-side anchoring section moves in opening/closing the slide door.

2 Claims, 5 Drawing Sheets

SLIDE DOOR CONSTANT FEEDING SYSTEM

TECHNICAL FIELD

The present invention relates to a slide door constant power feeding system and more specifically to a slide door constant power feeding system that can be installed in a compact car body and whose crossover portion of a wire harness does not interfere with a wall portion of a door trim in opening/closing a slide door.

BACKGROUND ART

A wire harness is wired between a car body and a slide door to constantly feed power to electrical components installed in the slide door. Normally, a crossover portion of the wired wire harness moves in a horizontal direction for example in opening/closing the slide door. FIG. 5 is a perspective view showing a prior art slide door constant feeding system. When a car body becomes compact, a space for installing the slide door constant feeding system is limited and only a space above a scarf plate 101 is usable in many occasions.

If the slide door constant feeding system is disposed in the space above the scarf plate 101, a door-side feeding fixture disposed therein is exposed as it is when the door is fully closed. It becomes visible from passengers within the car and may contact with limbs, clothes and belongings of the passengers. It is troublesome in terms of safety and durability of the slide door constant feeding system if the fixture contacts with the limbs, clothes and belongings of the passengers. The safety and durability can be improved by covering the door-side feeding fixture by providing a wall portion 103 on a door trim 102. Then, it becomes possible to make the fixture invisible from the passengers within the car, to avoid it from contacting with the limbs, clothes and belongings of the passengers and to keep beauty of the interior.

PRIOR ART DOCUMENT

Patent Document

[Patent Document 1] Japanese Patent Application Laid-open (JP-A) No. 2004-25999
[Patent Document 2] Japanese Patent Application Laid-open (JP-A) No. 2010-23757

DISCLOSURE OF INVENTION

Problems to be Solved by the Invention

However, if the wall portion 103 is provided on the door trim 102, there is such a problem that the crossover portion of the wire harness fixed to the door-side feeding fixture disposed in the space above the scarf plate 101 interferes with the wall portion in opening/closing the door, thus disabling smooth operations of the door. Accordingly, it has been desired to realize a slide door constant feeding system whose crossover portion of a wire harness does not interfere with a wall portion of a door trim in opening/closing the door even if the wall portion 103 is provided on the door trim 102 of the compact body.

Accordingly, the invention aims at providing a slide door constant feeding system which is applicable to a compact car body, whose crossover portion of a wire harness does not interfere with a wall portion of a door trim in opening/closing a slide door and which excels in durability.

Means for Solving the Problems

In order to solve the prior art problem described above, the inventors have ardently studied the case and made the invention based on results of the study described above.

According to a first aspect of the slide door constant feeding system of the invention, the slide door constant feeding system comprises:

a door-side feeding fixture having a main part attached to a door trim, a leg member whose one end is attached to the main part, and a door-side anchoring section attached to other end of the leg member and anchoring a door-side end of a crossover portion of a wire harness so that the door-side anchoring section moves in opening/closing the slide door;

a body-side feeding fixture attached to a car body and anchoring a body-side end of the crossover portion; and the wire harness for feeding power from the car body-side to the door-side.

According to a second aspect of the slide door constant feeding system of the invention, the slide door constant feeding system comprises:

a door-side feeding fixture having a main part having a shape of U in section and attached positionably to a door trim, leg members whose one ends are turnably attached respectively to lower ends, facing to each other, of the main part, and a door-side anchoring section having a shape of U in section, turnably attached respectively to other ends of the leg members and anchoring a door-side end of a crossover portion of a wire harness so that the door-side anchoring section moves up and down in a direction perpendicular to the ground in opening/closing the slide door;

a body-side feeding fixture having a spring member for applying a predetermined tension to the crossover portion, attached to a car body and anchoring a body-side end of the crossover portion; and the wire harness for feeding power from the car body-side to the door-side.

According to a third aspect of the slide door constant feeding system of the invention, the respective leg members of the door-side feeding fixture are positioned in parallel with the ground and straightly by the spring member when the door is fully closed; and the respective leg members of the door-side feeding fixture are positioned vertically to the ground when the door is opened to a predetermined position.

Advantageous Effects

According to the slide door constant feeding system of the invention, the door-side feeding fixture can be moved in the vertical direction, so that it is possible to avoid the crossover portion of the wire harness from interfering with a wall portion of the door trim even if the door trim is provided with the wall portion.

Still more, according to the slide door constant feeding system of the invention, the door-side feeding fixture can be moved in the vertical direction and the body-side feeding fixture can be moved in the longitudinal direction by providing a 4-axis link structure movable up and down in the door-side feeding fixture and by applying a tension to the crossover portion by using the spring in the body-side feeding fixture. Accordingly, it is possible to steadily avoid the crossover portion of the wire harness from interfering with the wall portion of the door trim.

Further, according to the slide door constant feeding system of the invention, the spring of the body-side feeding fixture keeps a highly tensioned state of the wire harness when the door is fully closed, so that it is possible to avoid strange noises from being generated even if the vehicle vibrates. It is also possible to absorb various tolerances, an over-stroke amount and to absorb various dispersions by the force of the spring of the body-side feeding fixture.

BEST MODE(S) FOR CARRYING OUT THE INVENTION

According to one mode of a slide door constant feeding system of the invention, the slide door constant feeding system comprises:

a door-side feeding fixture having a main part attached to a door trim, a leg member whose one end is attached to the main part, and a door-side anchoring section attached to other end of the leg member and anchoring a door-side end of a crossover portion of a wire harness;

a body-side feeding fixture attached to a car body and anchoring a body-side end of the crossover portion; and the wire harness for feeding power from the car body-side to the door-side.

Furthermore, the door-side anchoring section moves in opening/closing the slide door.

According to another mode of the slide door constant feeding system of the invention, the slide door constant feeding system comprises:

a door-side feeding fixture having a main part having a shape of U in section and attached positionably to a door trim, leg members whose one ends are turnably attached respectively to lower ends, facing to each other, of the main part, and a door-side anchoring section having a shape of U in section, turnably attached respectively to other ends of the leg members and anchoring a door-side end of a crossover portion of a wire harness;

a body-side feeding fixture having a spring member for applying a predetermined tension to the crossover portion, attached to a car body and anchoring a body-side end of the crossover portion; and the wire harness for feeding power from the car body-side to the door-side.

Furthermore, the door-side anchoring section moves up and down in a direction perpendicular to the ground in opening/closing the slide door.

Figure 1:
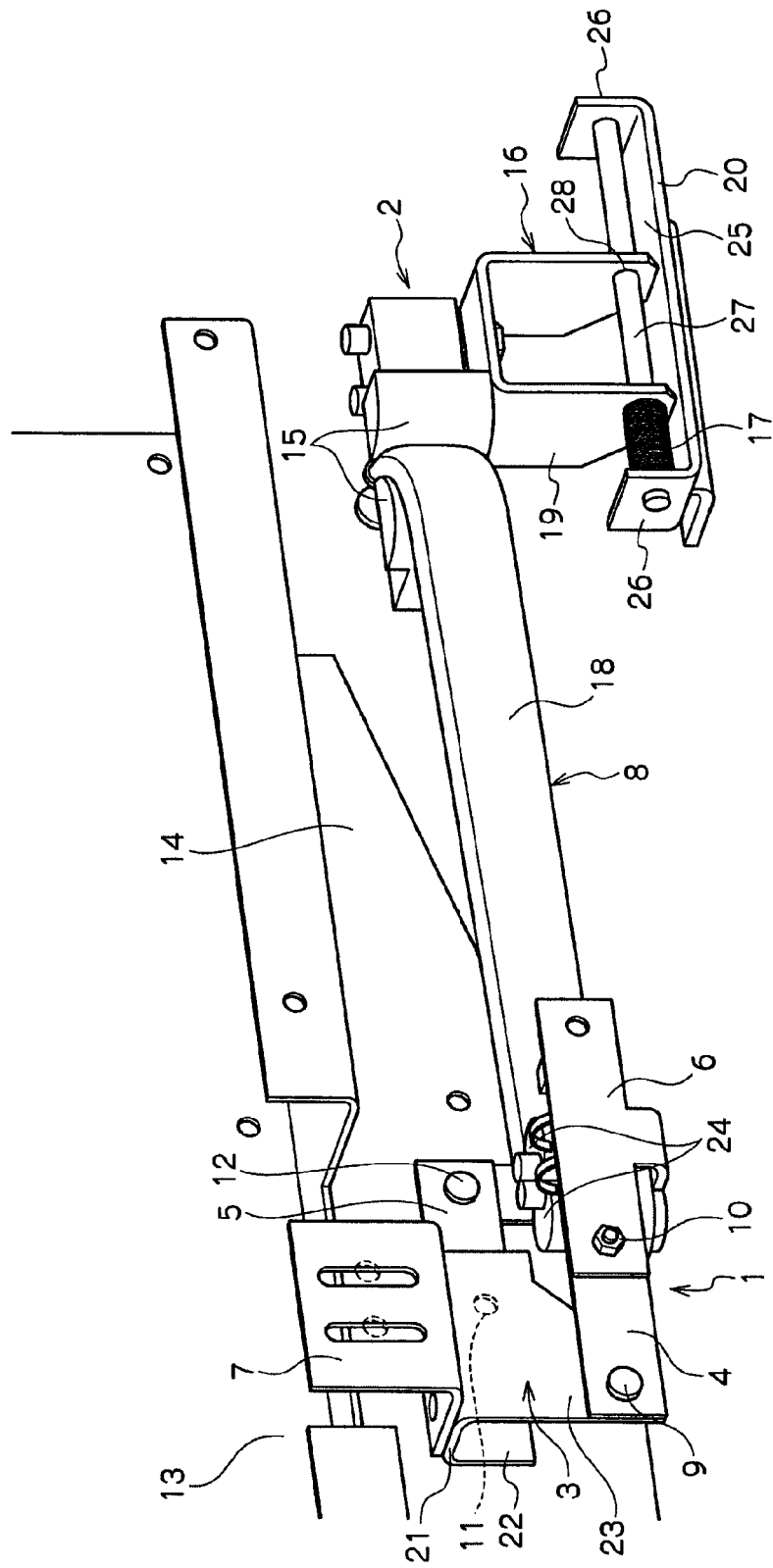
FIG. 1 is a perspective view illustrating a slide door constant feeding system of the invention in a condition in which a slide door is fully closed.

FIG. 1 is a perspective view illustrating the slide door constant feeding system of the invention in a condition in which the slide door is fully closed. The slide door constant feeding system of the invention comprises a door-side feeding fixture 1 fixed on the door-side, a body-side feeding fixture 2 fixed to the body-side and a wire harness 8 for feeding power from the body-side to the door-side.

The door-side feeding fixture 1 includes a main part 3 having a shape of U in section and positionably attached to a door trim 13 through an intermediary of a plate member 7 having a shape of L in section, leg members 4 and 5 attached respectively to lower end portions, facing to each other, of the main part 3 so that their one ends are turnable, and a door-side anchoring section 6 having a shape of U in section and attached turnably to other ends of the leg members 4 and 5 to anchor a door-side end of a crossover portion 18 of the wire harness 8.

The main part 3 is a plate member formed into the shape of U in section and integrally having a flat upper surface 21 and vertical surfaces 22 and 23 located at both ends of the upper surface 21 while facing to each other. The upper surface 21 is connected with a bottom surface of the plate member 7 having the shape of L in section. The L-shaped plate member 7 is provided with vertically long grooves formed on a vertical surface of the member so that the main part 3 can be positioned in a vertical direction by fixing a screw e.g. to the grooves for example.

One end of the leg member 5 (a left-side end in the figure) is turnably attached to one vertical surface 22 (at the backside in the figure) of the main part 3, which is located so as to face the other, by a pivot member 11. In the same manner, one end of the leg member 4 (the left-side end in the figure) is turnably attached to the other vertical surface 23 (the frontside in the figure) of the main part 3, which is located so as to face the other, by a pivot member 9. Another end of the leg member 5 is turnably attached to one end of the door-side anchoring section 6 by a pivot member 12. In the same manner, another end of the leg member 4 is turnably attached to another end of the door-side anchoring section 6 by a pivot member 10.

It is noted that the door-side anchoring section 6 can be moved up and down in the vertical direction as the leg members 4 and 5 turn as described later. A pair of door-side wire harness anchoring member 24 for anchoring the wire harness is mounted in the door-side anchoring section 6.

The body-side feeding fixture 2 includes a pair of body-side wire harness anchoring members 15 for anchoring the wire harness 8 and a carriage member 16 for slidably carrying the pair of body-side wire harness anchoring members 15. The carriage member 16 comprises a carriage main body 19 having a flat carriage surface and side surfaces facing to each other and formed integrally with the flat carriage surface, and a supporting member 20 having a spring portion 17 and slidably supporting the carriage main body 19.

The supporting member 20 is formed of a bottom surface portion 25 and wall surface portions 26 formed on both sides of the bottom surface portion 25 and has a rod-like member 27 fixed to the wall surface portions 26 and the spring portion 17 attached to the rod-like member 27. The rod-like member 27 is disposed so as to be inserted through holes 28 formed at lower parts of the carriage main body 19. The body-side feeding fixture 2 is attached to the car body so that the spring portion 17 generates a tension so that the crossover portion 18 of the wire harness 8 is tensioned in a longitudinal direction thereof when the slide door is fully closed. The rod-like member 27 is disposed along a longitudinal direction of the car body and the carriage member 16 moves along the longitudinal direction of the car body when the tension of the spring portion 17 changes.

It is noted that a wall portion 14 is provided so that the door-side feeding fixture 1 installed to the slide door is not exposed to an interior of the car body. FIG. 1 shows a condition of an inside of the slide door, seen from an outside of the car body, in which the wall portion 14 is attached to the door trim 13 so as to cover the door-side feeding fixture 1. As shown in FIG. 1, the crossover portion 18 is tensioned when the slide door is fully closed and no interference occurs between the crossover portion 18 and the wall portion 14.

Figure 2:
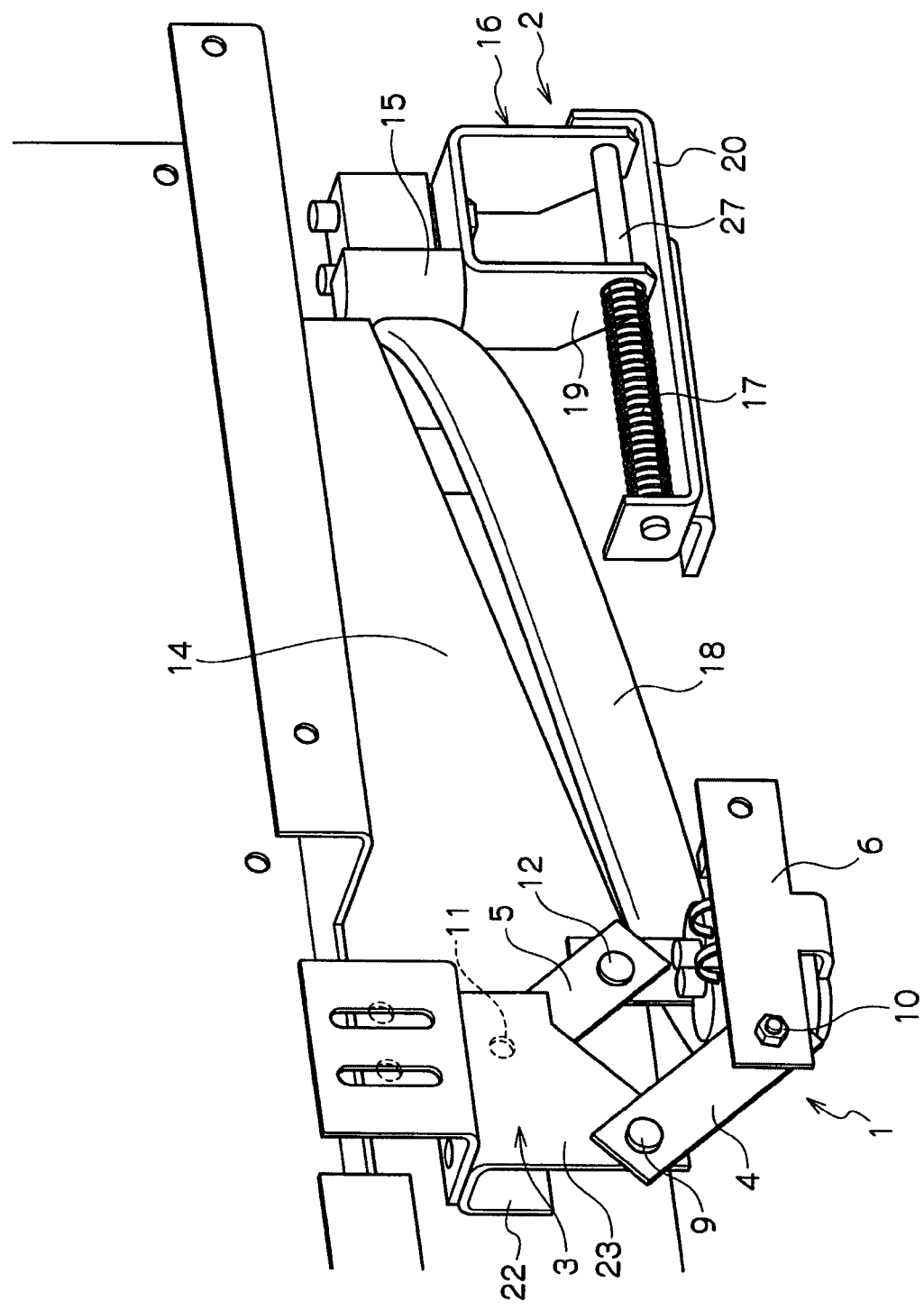
FIG. 2 is a perspective view illustrating the slide door constant feeding system of the invention at a point on a way of move of the slide door from the fully closed condition to an opened condition.

FIG. 2 is a perspective view illustrating the slide door constant feeding system of the invention at a point on a way of move of the slide door from the fully closed condition to an opened condition. When the slide door moves from the fully closed condition to the opened condition as shown in FIG. 2, the crossover portion 18 is released from the tensioned condition and along with that, the tension caused by the spring portion 17 inserted around the rod-like member 27 mounted to the supporting member 20 gradually decreases and the carriage member 16 moves to a rear side of the car body along the longitudinal direction of the car body until when it abuts the wall surface portion 26 of the supporting member 20 in the body-side feeding fixture 2.

Meanwhile, in the door-side feeding fixture 1, when the crossover portion 18 is released from the condition in which it is tensioned, a force acting horizontally on the door-side anchoring section 6 from the crossover portion 18 decreases and the door-side anchoring section 6 moves down vertically toward the ground by the gravity, i.e., by its own weight. That is, the leg member 5 turnably attached to the vertical surface portion 22 (on the backside in the figure) of the main part 3 fixed to the door trim 13 through the intermediary of the L-shaped plate member 7 turns obliquely downward while drawing a circular arc centering on the pivot member 11. In conjunction with that, the leg member 4 turnably attached to the vertical surface portion 23 (the front side in the figure) of the main part 3 turns obliquely downward while drawing a circular arc centering on the pivot member 9. That is, the tension of the spring portion 17 is loosened by a move of the slide door and the body-side feeding fixture 2 moves to a setback position.

Still more, in conjunction with the turns of the leg members 4 and 5 described above, one end of the door-side anchoring section 6 turnably attached to the other end of the leg member 5 by the pivot member 12 also turns obliquely downward while drawing a circular arc centering on the pivot member 11. In the same time, the other end of the door-side anchoring section 6 turnably attached to the other end of the leg member 4 also turns obliquely downward while drawing a circular arc centering on the pivot member 9. It is noted that the door-side anchoring section 6 turns obliquely downward while drawing a circular arc and while keeping its posture, i.e., in parallel with the ground surface, as a whole due to the turns of the leg members 4 and 5.

Then, along with the downward move of the door-side anchoring section 6 of the door-side feeding fixture 1 of the slide door, the crossover portion 18 inclines as shown in FIG. 2 and the inclination of the crossover portion 18 coincides almost with an inclination of a tapered portion at a lower end of the wall portion 14 attached to the door trim 13, so that it becomes possible to steadily avoid the crossover portion 18 from interfering with the wall portion 14.

Figure 3:
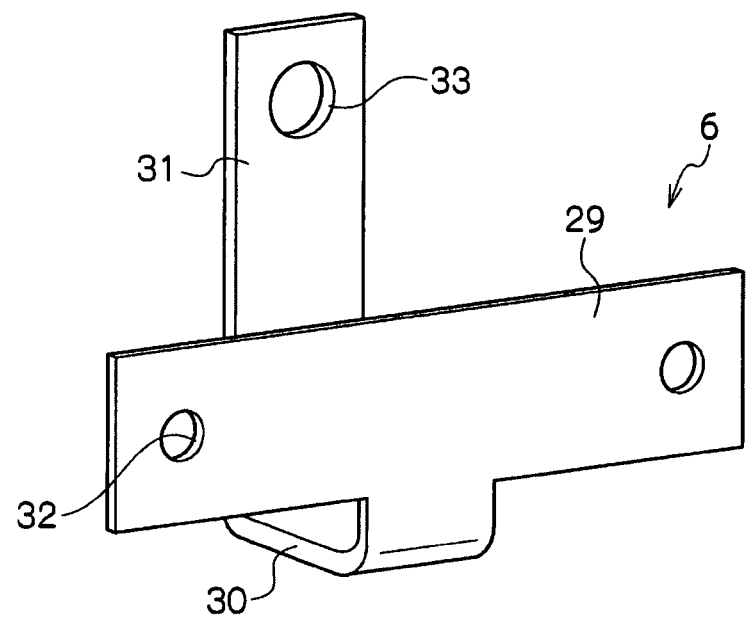
FIG. 3 is a perspective view illustrating a door-side anchoring section.

FIG. 3 is a perspective view illustrating the door-side anchoring section. As shown in FIG. 3, the door-side anchoring section 6 is integrally formed of a front plate portion 29, a flat bottom surface portion 30 extending downward from an approximate center lower part of the front plate portion 29 and bent there from, and a back plate portion 31 that is bent further and extending in parallel with the front plate portion 29. A hole 32, corresponding to the pivot member 10, is formed at the end part of the front plate portion 29 (on the left side in the figure). A hole 33, corresponding to the pivot member 12, is formed at an upper end of the back plate portion 31. The pair of door-side wire harness anchoring members 24 for anchoring the wire harness explained with reference to FIG. 1 is mounted on the flat bottom surface portion 30.

Figure 4:
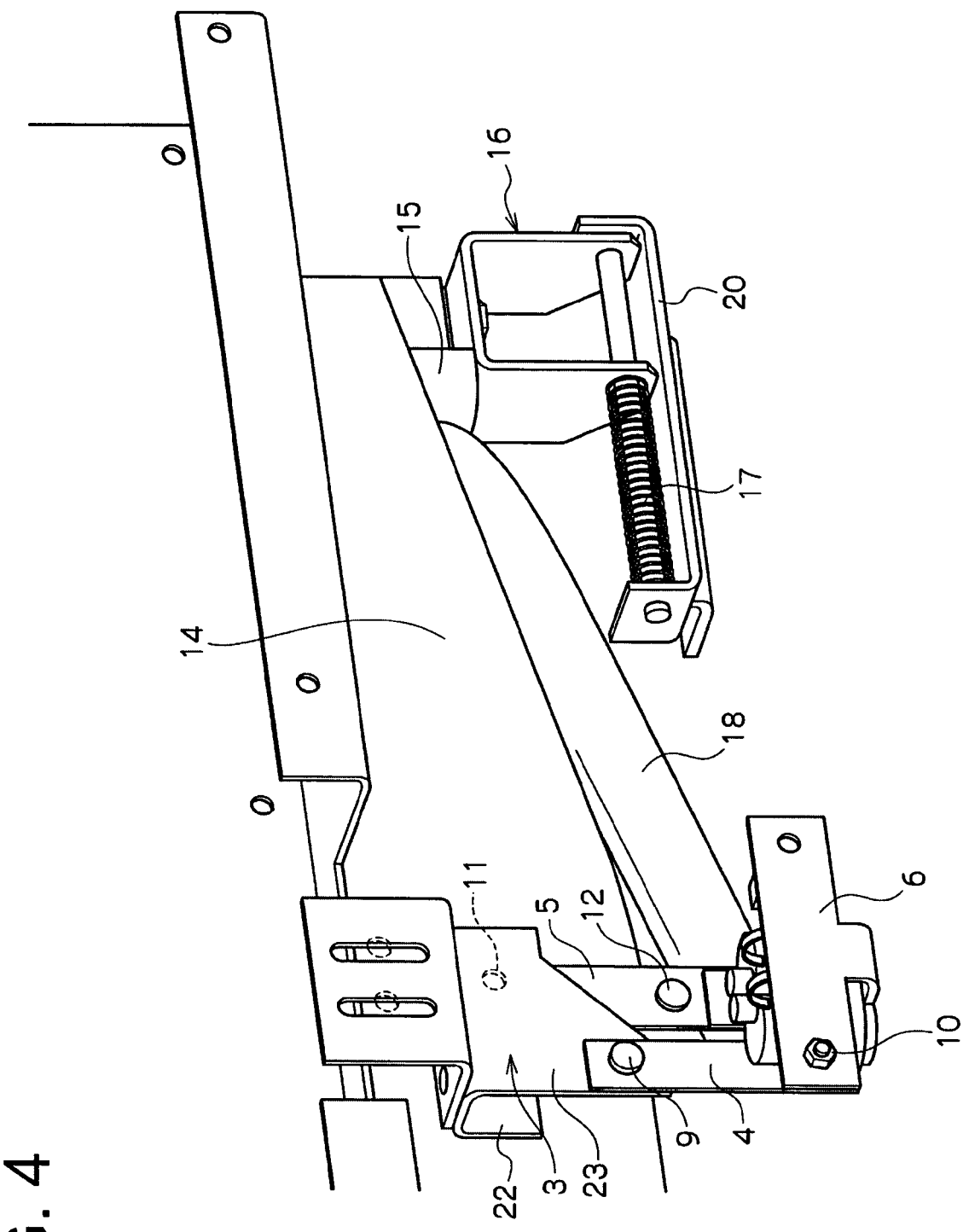
FIG. 4 is a perspective view illustrating the slide door constant feeding system of the invention at a point on the way of the move of the slide door from the fully closed condition to the opened condition and the door-side anchoring section is located at a lowest point.
Figure 5:
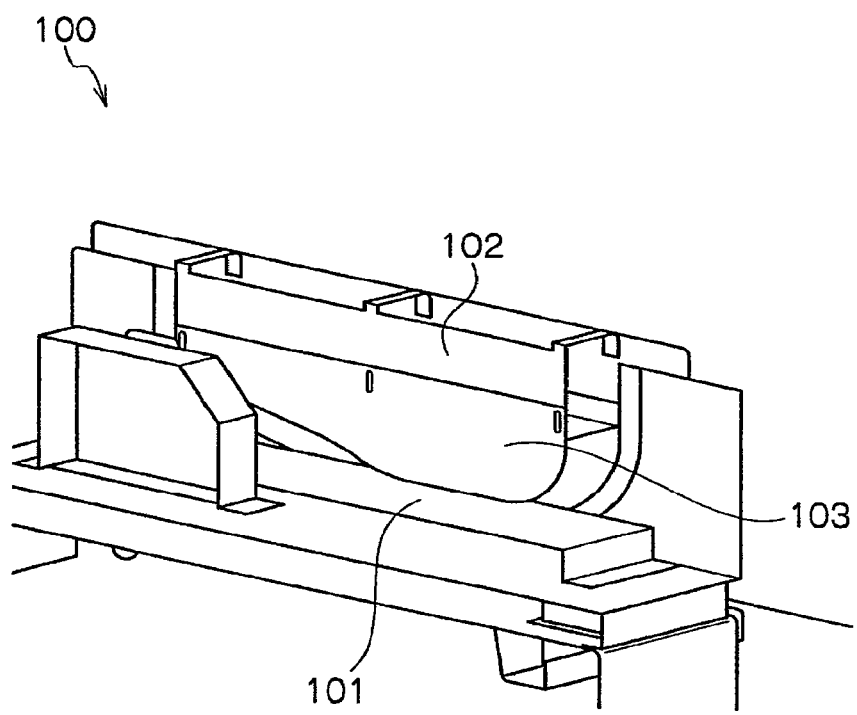
FIG. 5 is a perspective view illustrating a prior art slide door constant feeding system.

FIG. 4 is a perspective view illustrating the slide door constant feeding system of the invention on the way of the move of the slide door from the fully closed condition to the opened condition and the door-side anchoring section is located at a lowest point.

The leg members 4 and 5 of the door-side feeding fixture 1 explained with reference to FIG. 2 turn further obliquely downward from the inclined position by drawing a circular arc centering on the pivot members 9 and 11, and move until when the leg members 4 and 5 are vertically positioned, respectively, as shown in FIG. 4. Then, the door-side anchoring section 6 also turns obliquely downward and reaches to the lowest point while drawing a circular arc and while keeping its posture, i.e., in parallel with the ground, as a whole due to the turns of the leg members 4 and 5.

The body-side feeding fixture 2 keeps the same position with the position explained with reference to FIG. 2. That is, the tension of the spring portion 17 inserted around the rod-like member 27 mounted on the supporting member 20 is reduced and the carriage member 16 moves toward the rear side of the car body along the longitudinal direction of the car body and is in contact with the wall surface portion 26 of the supporting member 20.

As described above, when the slide door is opened further from the condition explained with reference to FIG. 2, the leg members 4 and 5 of the door-side feeding fixture 1 are vertically positioned in parallel with each other and the door-side anchoring section 6 is positioned at the lowest point as shown in FIG. 4. When the door-side anchoring section 6 is positioned at the lowest point, the inclinations of the tapered portion at the lower part of the wall portion 14 and the crossover portion 18 become almost the same. Accordingly, it is possible to steadily avoid the crossover portion 18 from interfering with the wall portion 14 also in this condition.

The operations of the door-side feeding fixture 1 and the body-side feeding fixture 2 during when the slide door is moved from the fully closed condition to the fully opened condition described above will be explained below as a whole. The body-side feeding fixture 2 advances to a most advanced position when the slide door is fully closed due to the move of the slide door heading to the front part of the vehicle. The spring portion 17 is contracted and generates the highly tensioned state. The door-side anchoring section 6 of the door-side feeding fixture 1 is located at the uppermost position by being tensioned by the force of the spring portion of the body-side feeding fixture 2 at this time.

In a condition in which the slide door is slightly opened, the spring that has been contracted is loosened by the move of the slide door and corresponding to that, the body-side feeding fixture 2 moves toward the setback position. The door-side anchoring section 6 of the door-side feeding fixture 1 is kept at the same level with that when the door is fully closed at this time because the spring force still remains even through the spring is loosened.

In a condition in which the slide door is moved and opened further, the spring force is completely loosened and the body-side feeding fixture 2 is located at the most setback position. The position of the body-side feeding fixture 2 does not change even if the slide door is opened further after that. The door-side anchoring section 6 of the door-side feeding fixture 1 starts to move downward at this time because the spring force of the body-side feeding fixture 2 does not act on it.

In the condition in which the slide door is opened further as shown in FIG. 2, the position of the body-side feeding fixture 2 does not change and the leg members 4 and 5 of the door-side feeding fixture 1 turn obliquely downward while drawing the circular arc respectively centering on the pivot members 9 and 11 as described above. In conjunction with that, the door-side anchoring section 6 also turns obliquely downward while drawing the circular arc and while keeping its posture, i.e., in parallel with the ground, as a whole. Although the wall portion 14 attached to the door trim 13 would otherwise overlap with the crossover portion 18 at this time, the crossover portion 18 inclines equally with the tapered portion of the lower end part of the wall portion 14, so that no interference occurs between the wall portion 14 and the crossover portion 18.

In the condition in which the slide door is opened further as shown in FIG. 4, the position of the body-side feeding fixture 2 does not change and the leg members 4 and 5 of the door-side feeding fixture 1 turn further obliquely downward to the vertical position while drawing the circular arc respectively centering on the pivot members 9 and 11 as described above. In conjunction with that, the door-side anchoring section 6 also turns obliquely downward to the lowest point while drawing the circular arc and while keeping its posture, i.e., in parallel with the ground, as a whole. Even if the slide door is opened further from this condition, the position of the door-side feeding fixture 1 does not change and the crossover portion 18 flexes and follows the slide door thereafter.

It is noted that the door-side feeding fixture 1 of the present invention is not limited to the mode described above and the shapes of the members and the combinations thereof may be appropriately modified as long as the door-side feeding fixture 1 has a structure capable of obtaining the same advantageous effects as described above by moving the door-side anchoring section 6 up and down.

Thus, the invention can provide the slide door constant feeding system which is applicable to a compact car body, whose crossover portion of a wire harness does not interfere with the wall portion of the door trim in opening/closing the slide door and which excels in durability.

EXPLANATIONS OF LETTERS OR NUMERALS 1 door-side feeding fixture
2 body-side feeding fixture
3 main part
4 leg member
5 leg member
6 door-side anchoring portion
7 L-shaped plate member
8 wire harness
9 pivot member
10 pivot member
11 pivot member
12 pivot member
13 door trim
14 wall portion
15 body-side wire harness anchoring member
16 carriage member
17 spring portion
18 crossover portion
20 supporting member
24 door-side wire harness anchoring member
27 rod-like member

The invention claimed is:

1. A slide door constant feeding system, comprising:
 a door-side feeding fixture having a main part having a shape of U in section and attached positionably to a door trim, leg members whose one ends are turnably attached respectively to lower ends, facing to each other, of said main part, and a door-side anchoring section having a shape of U in section, turnably attached respectively to other ends of said leg members and anchoring a door-side end of a crossover portion of a wire harness so that said door-side anchoring section moves up and down in a direction perpendicular to the ground in opening/closing the slide door;
 a body-side feeding fixture having a spring member for applying a predetermined tension to said crossover portion, attached to a car body and anchoring a body-side end of said crossover portion; and
 the wire harness for feeding power from the car body-side to the door-side.

2. The slide door constant feeding system according to claim 1, wherein the respective leg members of said door-side feeding fixture are positioned in parallel with the ground and straightly by said spring member when the door is fully closed; and
 the respective leg members of said door-side feeding fixture are positioned vertically to the ground when the door is opened to a predetermined position.

* * * * *